(12) United States Patent
Favaretto

(10) Patent No.: US 9,023,502 B2
(45) Date of Patent: May 5, 2015

(54) SYSTEM FOR THE STORAGE OF ELECTRIC ENERGY WITH REDUCED THICKNESS FOR A VEHICLE WITH ELECTRIC PROPULSION

(75) Inventor: Fabrizio Favaretto, Formigine (IT)

(73) Assignee: Ferrari S.P.A., Modena (IT)

( * ) Notice: Subject to any disclaimer, the term of this patent is extended or adjusted under 35 U.S.C. 154(b) by 216 days.

(21) Appl. No.: 13/404,406

(22) Filed: Feb. 24, 2012

(65) Prior Publication Data
US 2012/0217076 A1    Aug. 30, 2012

(30) Foreign Application Priority Data

Feb. 24, 2011  (IT) .............. BO2011A0081

(51) Int. Cl.
*H01M 2/10*  (2006.01)
*B60K 1/04*  (2006.01)
*H01M 10/04*  (2006.01)

(52) U.S. Cl.
CPC .............. *B60K 1/04* (2013.01); *H01M 2/1077* (2013.01); *H01M 2/1083* (2013.01); *H01M 10/0413* (2013.01); *H01M 10/0481* (2013.01)

(58) Field of Classification Search
None
See application file for complete search history.

(56) References Cited

U.S. PATENT DOCUMENTS

| | | | | |
|---|---|---|---|---|
| 5,308,717 | A * | 5/1994 | Gordin | 429/99 |
| 8,421,642 | B1 * | 4/2013 | McIntosh et al. | 340/686.1 |
| 2003/0162091 | A1 * | 8/2003 | Watanabe et al. | 429/156 |
| 2004/0021442 | A1 * | 2/2004 | Higashino | 320/112 |
| 2005/0147878 | A1 * | 7/2005 | Miyahisa et al. | 429/174 |
| 2009/0208828 | A1 | 8/2009 | Kanai et al. | |
| 2010/0314950 | A1 * | 12/2010 | Rutkowski et al. | 307/125 |
| 2011/0184599 | A1 | 7/2011 | Cimatti et al. | |
| 2011/0314771 | A1 * | 12/2011 | Dall'omo | 53/376.7 |

FOREIGN PATENT DOCUMENTS

| | | |
|---|---|---|
| DE | 1914216 | 10/1970 |
| DE | 7343797 | 5/1974 |
| DE | 102008010823 | 8/2009 |
| EP | 1710859 | 10/2006 |
| EP | 1936717 A1 | 6/2008 |

(Continued)

OTHER PUBLICATIONS

Fukue (JP 2004-262413) (a raw machine translation) (Abstract, Detailed Description and Drawings) (Sep. 24, 2004).*
Batterie (DE7343797) (a raw machine translation) (Abstract, Detailed Description and Drawings) (May 30, 1974).*

(Continued)

*Primary Examiner* — Milton I Cano
*Assistant Examiner* — Carmen Lyles-Irving
(74) *Attorney, Agent, or Firm* — Kevin D. Jablonski; Lane Powell PC

(57) ABSTRACT

An embodiment of a system for the storage of electric energy with reduced thickness for a vehicle with electric propulsion; the storage system has: a support plane; and a plurality of chemical batteries, each of which includes at least one electrochemical cell which rests on the support plane and has a flat parallelepiped shape with two mutually parallel, opposite larger bases; in each chemical battery the electrochemical cell is arranged parallel to the support plane and rests a larger lower base on the support plane; and each chemical battery includes its own compression system which presses directly on a larger upper base of the electrochemical cell opposite to the larger lower base, keeps the electrochemical cell pressed against the support plane, and is independent from the compression systems of the other batteries.

13 Claims, 6 Drawing Sheets

(56) References Cited

FOREIGN PATENT DOCUMENTS

| EP | 2325034 | | 5/2011 | |
|---|---|---|---|---|
| JP | 2004-262413 | | 9/2004 | |
| JP | 2004262412 | A | 9/2004 | |
| JP | 2009283193 | | 12/2009 | |
| WO | WO 2010094635 | * | 8/2010 | .............. B65B 25/14 |

OTHER PUBLICATIONS

Emil (DE1914216) (a raw machine translation) (Abstract, Detailed Description and Drawings) (Oct. 15, 1970).*
Italian Search Report for Italian Application No. BO20110081, Ministero dello Sviluppo Economico, Munich, Oct. 12, 2011, pp. 2.
EP Search Report for EP Application No. 12156966, European Search Report, Munich, May 31, 2012, 3 pages.

* cited by examiner

SYSTEM FOR THE STORAGE OF ELECTRIC ENERGY WITH REDUCED THICKNESS FOR A VEHICLE WITH ELECTRIC PROPULSION

PRIORITY CLAIM

The instant application claims priority to Italian Patent Application No. BO2011A000081, filed Feb. 24, 2011, which application is incorporated herein by reference in its entirety.

TECHNICAL FIELD

An embodiment relates to a system for the storage of electric energy for a vehicle with electric propulsion.

An embodiment is advantageously applied to a road vehicle with hybrid propulsion, to which explicit reference will be made in the following description without therefore loosing in generality.

BACKGROUND

A hybrid vehicle includes an internal combustion thermal engine, which transmits torque to the drive wheels by means of a transmission provided with a gearbox, and at least one electric machine which is mechanically coupled to the drive wheels and electrically coupled to a storage system of electric energy. Normally, the storage system of electric energy includes a plurality of electrochemical batteries which are coupled together in series and in parallel.

The arrangement of the storage system in the vehicle may be very complex, particularly in the case of a sporty, high-performance vehicle which has very small interior spaces. In particular, the storage system must be possibly arranged near the electric machine to reduce the length of the electric connection cables (and thus to reduce the weight of the electric cables and the loss of power by Joule effect in the electric cables themselves), must be possibly arranged in position protected from collisions, must be arranged in position sheltered from sources of heat because it cannot withstand high temperatures, and must be arranged so as not to imbalance the vehicle with its considerable weight (in other words, as close to the center of gravity and to the ground as possible to obtain a good dynamic behavior of the vehicle).

In known vehicles, the aforesaid constraints force to arrange the batteries of the storage system in non-optimal positions and in all cases considerably limit the space usable for the batteries of the storage system. Consequently, the electric energy storage capacities of the storage system is limited, and consequently the possibility of using of the electric machine are also reduced.

It has been suggested to arrange the batteries of the storage system at the flatbed which constitutes the bottom wall of the passenger compartments (i.e. to rest the storage system on the flatbed or to insert the storage system in the boxed flatbed). The arrangement of the storage system at the flatbed offers many advantages, because in this manner the storage system is extremely protected from collisions being arranged within the safety cell of the passenger compartment, is relatively close to the electric machine, is arranged in a position which is not subject to overheating and which is easy to cool down, and is arranged very close to the ground in a central position.

However, the useful height for the storage system is low at the flatbed, particularly in the case of a sporty, high-performance vehicle having a very low overall ground clearance. Consequently, in order to be able to arrange the storage system at the flatbed, the batteries of the storage system must necessarily have a very thin overall thickness. Reducing the overall thickness of an automotive electrochemical battery beyond certain limits is problematic, because an electrochemical cell requires the presence of a constant, uniform contact between anode and cathode and the separator interposed between the anode and the cathode in order to work in optimal manner; to obtain such a constant, uniform contact, it is necessary to apply and keep a uniform compression force which pushes the anode and the cathode towards each other, and it is thus necessary to arrange a mechanical clamping element which generates the uniform compression force. The mechanical clamping element has a relatively high thickness, which added to the thickness of the electrochemical cell, determines a relatively high overall thickness of the electrochemical battery which is not compatible with the available vertical space at the flatbed of a sporty, high-performance vehicle.

Patent application JP2004262413A, which is incorporated by reference, describes a storage system for the storage of electric energy for a vehicle with electric propulsion. The storage system includes a series of batteries which are side by side and are arranged on a common support plane; furthermore, the storage system includes a fastening system provided with a single structure which is screwed to the support plane and keeps all the batteries pressed against the support plane.

SUMMARY

An embodiment is a storage system for the storage of electric energy for a vehicle with electric propulsion, which storage system is free from the drawbacks described above and at the same time allows optimizing the weight/performance ratio and is, at the same time, easy and cost-effective to make.

BRIEF DESCRIPTION OF THE DRAWINGS

An embodiment will now be described with reference to the accompanying drawings, which illustrate a non-limitative embodiment thereof, in which.

DETAILED DESCRIPTION

Figure 1:
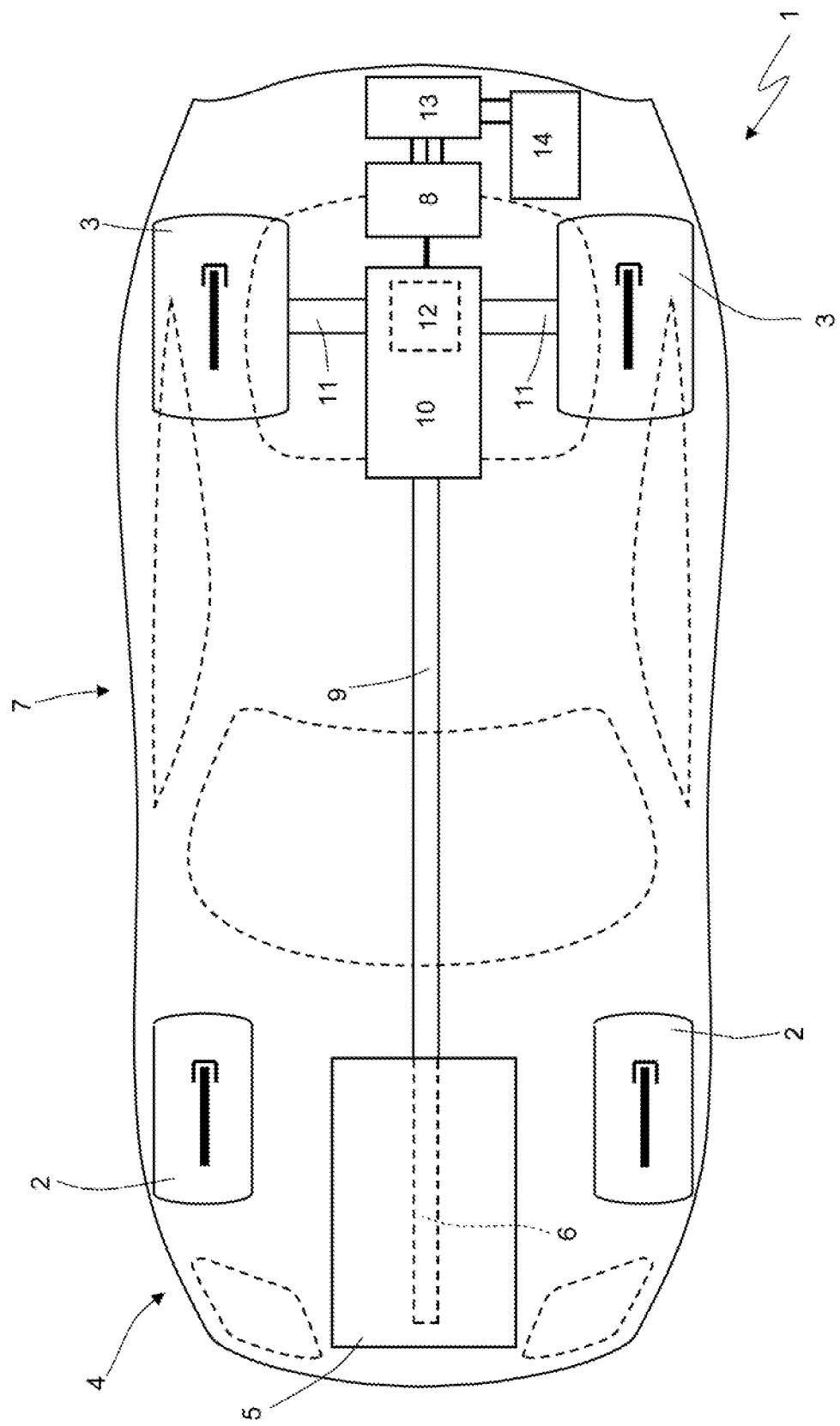
FIG. 1 is a diagrammatic, plan view of a road vehicle with hybrid propulsion according to an embodiment.

In FIG. 1, numeral 1 indicates as a whole a road vehicle with hybrid propulsion provided with two front wheels 2 and two rear drive wheels 3, which receive torque from a hybrid propulsion system 4.

The hybrid propulsion system 4 includes an internal combustion engine 5, which is arranged in frontal position and is provided with a drive shaft 6, an automatic manual transmission 7 (commonly named "AMT"), which transmits the torque generated by the internal combustion engine 5 to the rear drive wheels 3, and a reversible electric machine 8 (i.e. an electric machine which can work either as electric motor, using electric energy and generating mechanical torque, or as an electric generator, using mechanical energy and generating electric energy), which is mechanically coupled to the transmission 7.

The transmission 7 includes a transmission shaft 9, which on one end is angularly integral with the drive shaft 6, and on the other end is mechanically coupled to a twin-clutch gearbox 10, which is arranged in rear position and transmits motion to the rear drive wheels 3 by means of two axel shafts 11, which receive motion from a differential 12. The main electric machine 8 is mechanically coupled to the gearbox 10 and, in particular, is angularly integral to a primary shaft of the gearbox 10; for the coupling methods of the main electric machine 8 to the twin-clutch gearbox 10 reference is made, for example, to the description in patent application IT2009BO00752, which is incorporated by reference.

Figure 2:
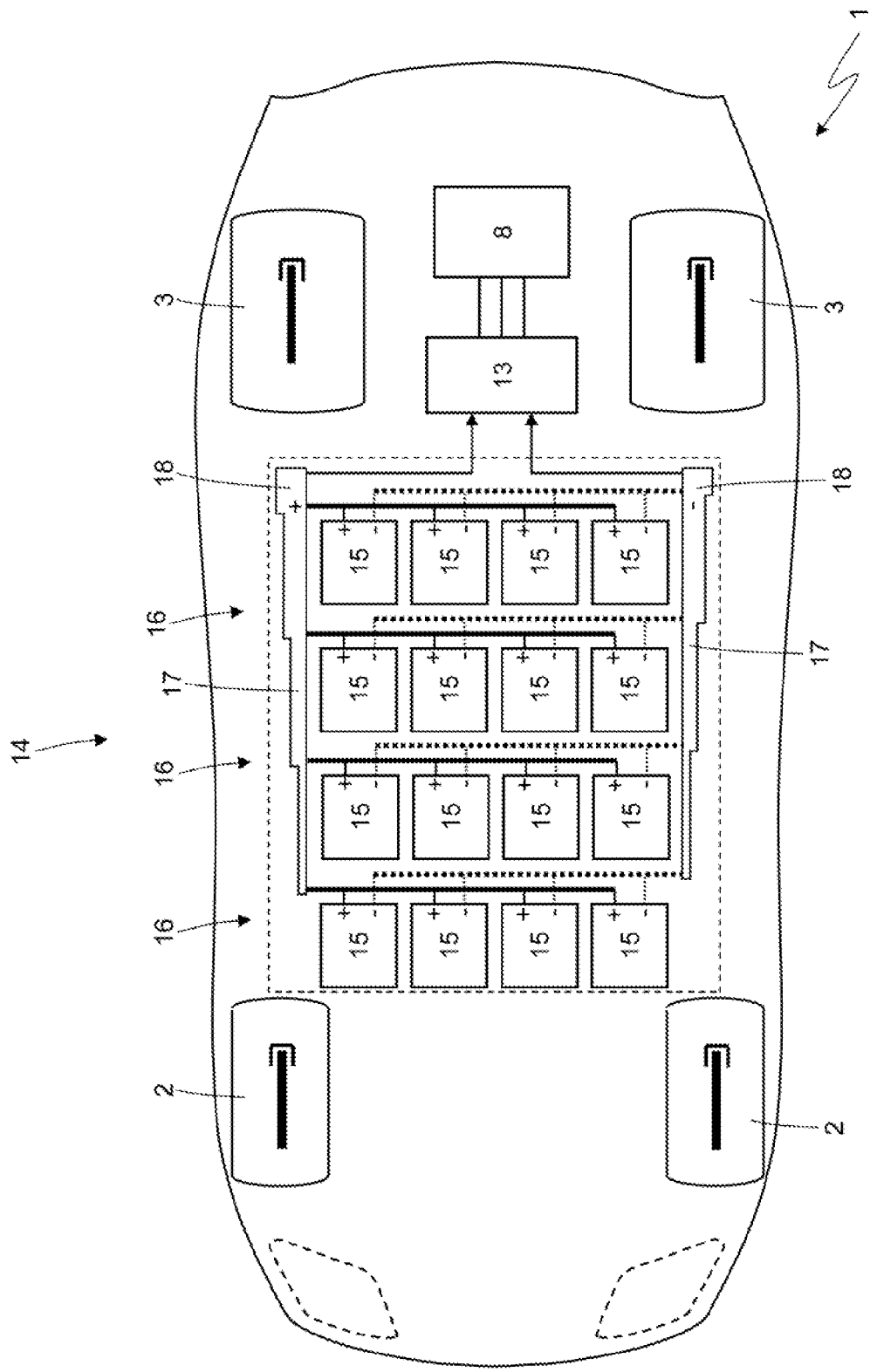
FIG. 2 is a diagrammatic view of a storage system for the storage of electric energy of the road vehicle in FIG. 1, made in accordance with an embodiment.
Figure 3:
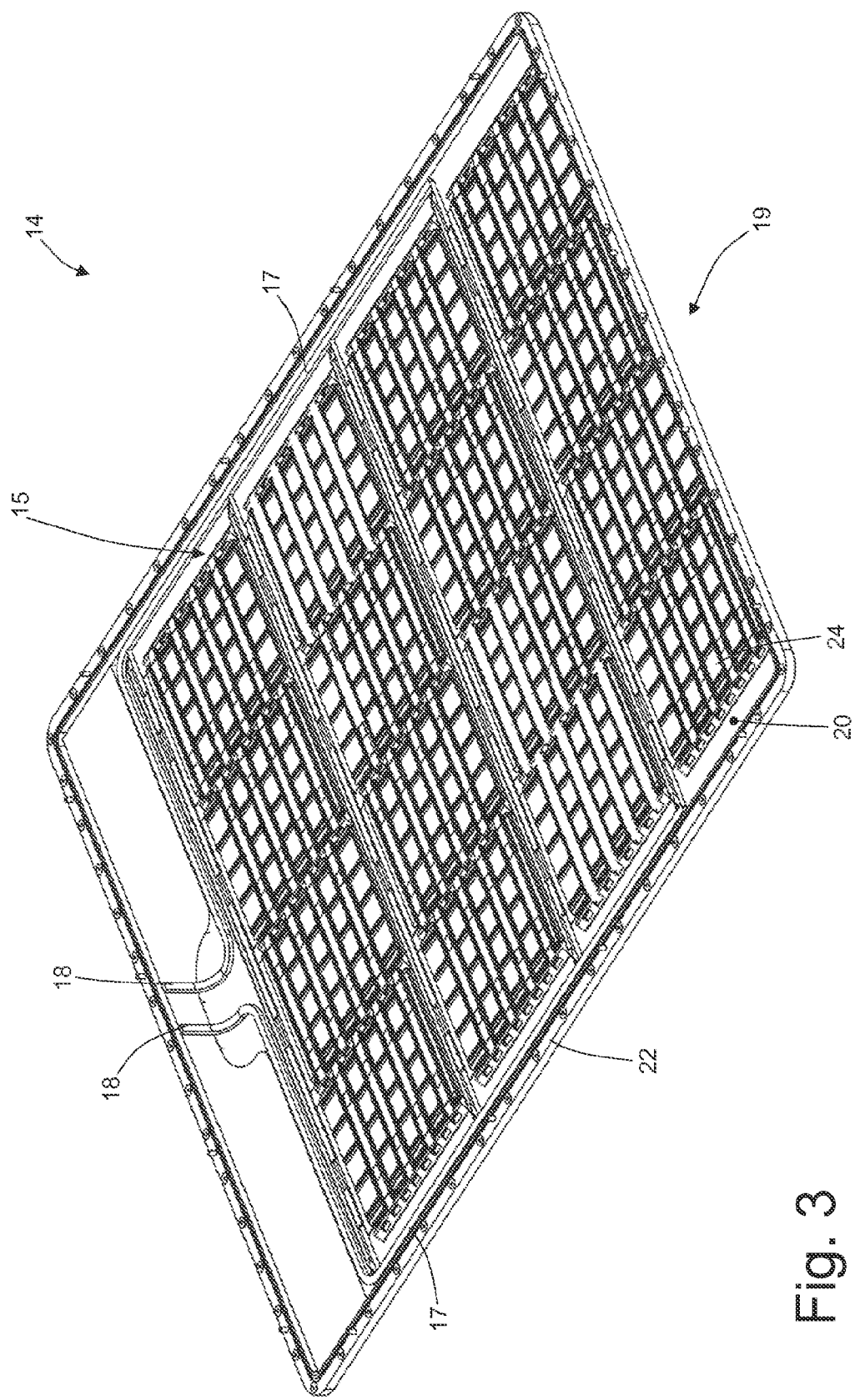
FIG. 3 is a perspective vehicle with parts removed for clarity of the storage system of electric energy of FIG. 2 according to an embodiment.
Figure 4:
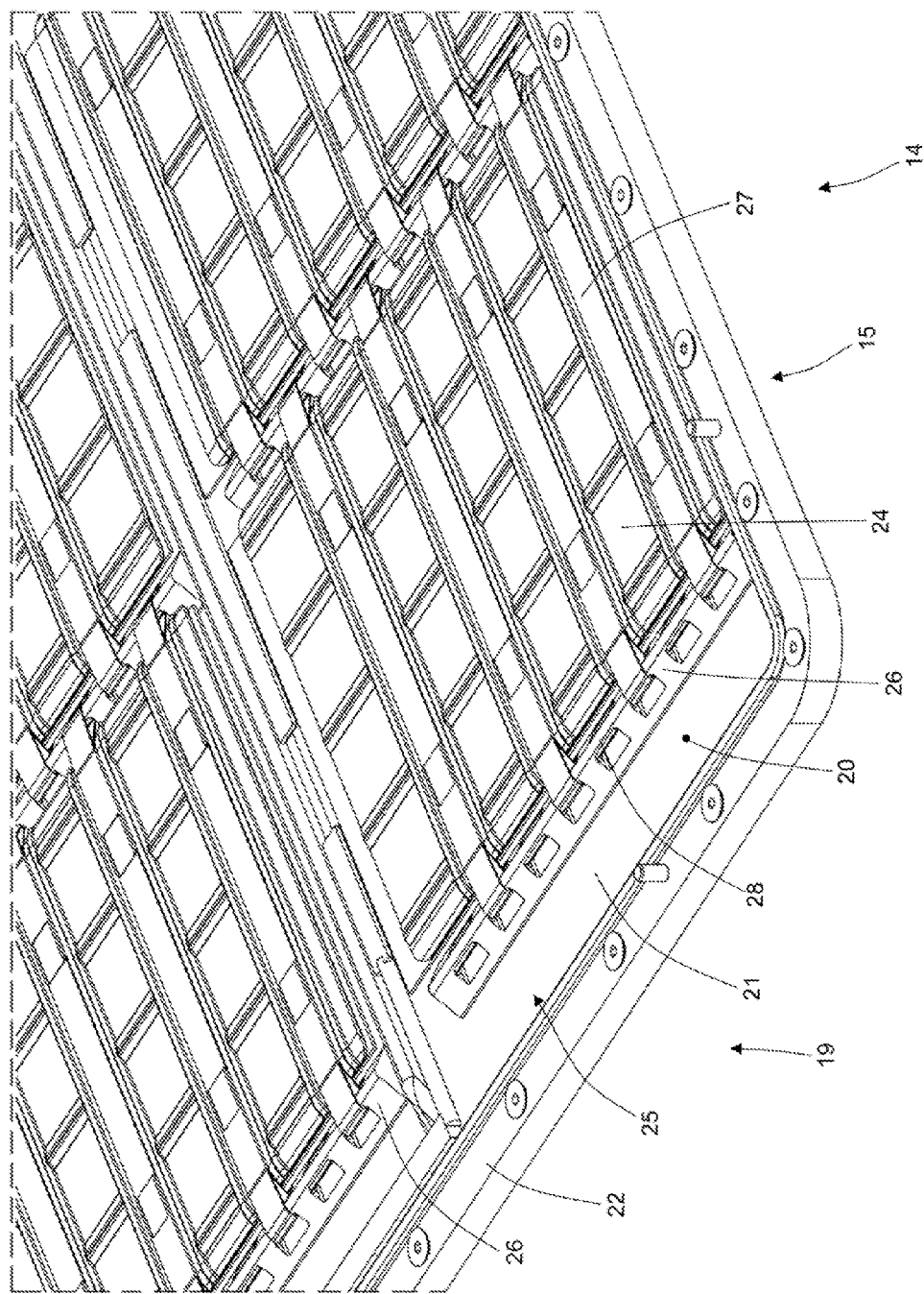
FIG. 4 is a magnified view of a detail in FIG. 3 according to an embodiment.
Figure 5:
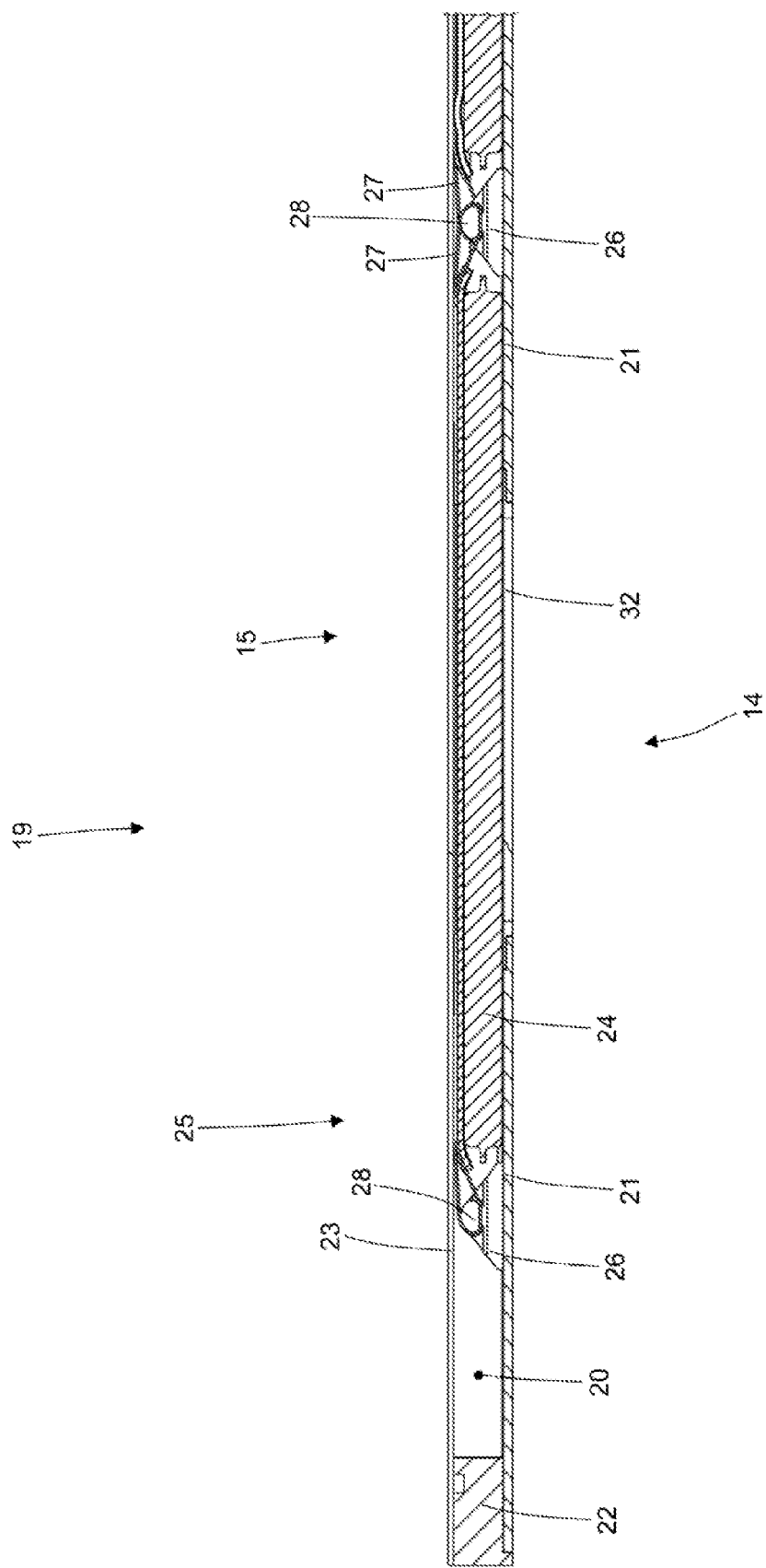
FIG. 5 is a partial cross-section view of the storage system for electric energy of FIG. 2 according to an embodiment.
Figure 6:
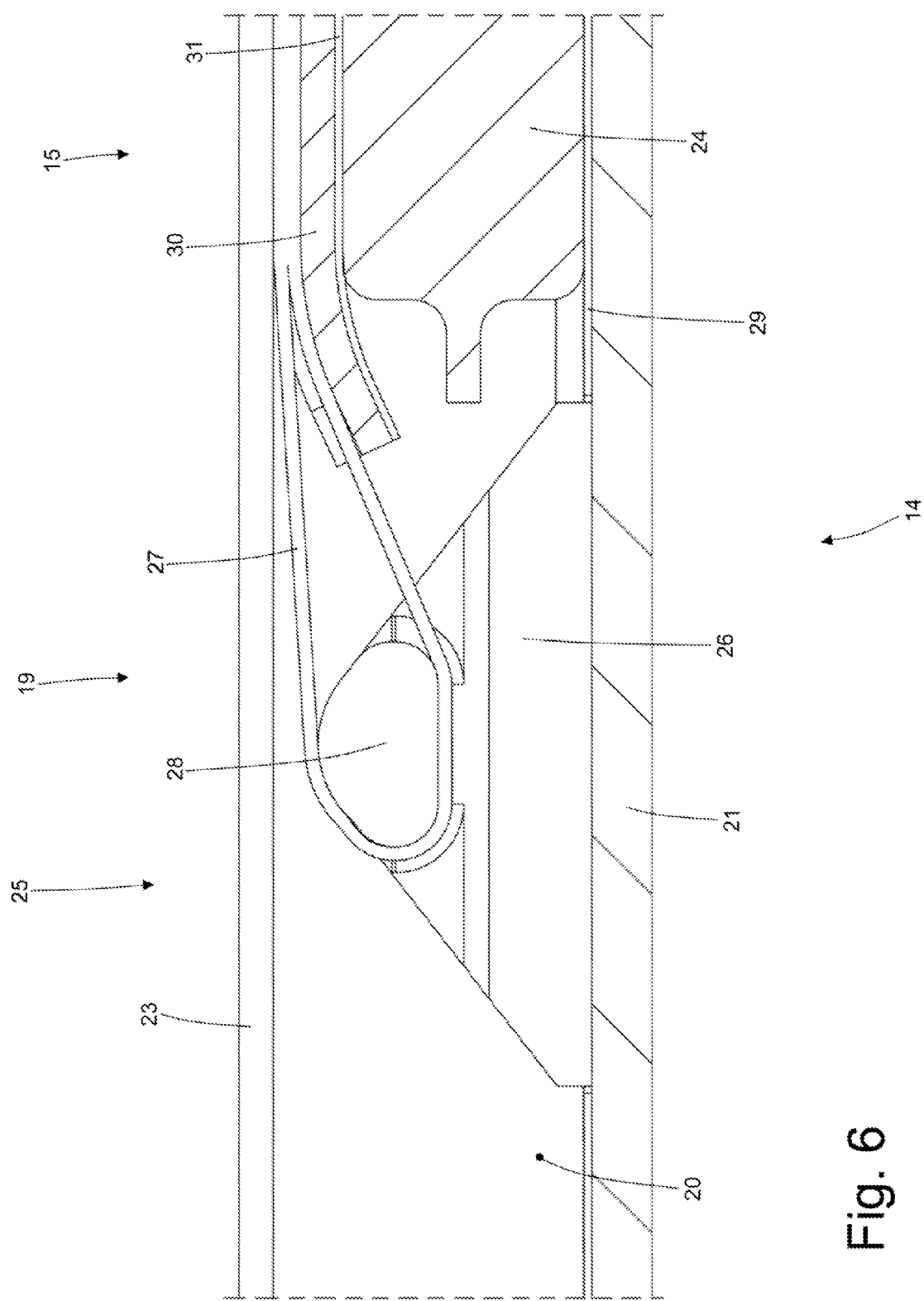
FIG. 6 is a magnified view of a detail in FIG. 5 according to an embodiment.

The electric machine 8 is driven by a two-way electronic power converter 13, which is coupled to a storage system 14 for the storage of electric energy. As shown in FIG. 2, the storage system 14 for the storage of electric energy includes a plurality of chemical batteries 15 coupled to each other in series and/or in parallel. As shown in FIG. 2, the chemical batteries 15 of the storage system 14 for the storage of electric energy are divided into groups 16. In the embodiments shown in the accompanying figures, four groups 16 are provided, each of which includes four chemical batteries 15 (these numbers are only an example of a non-limitative embodiment). In the embodiment shown in FIG. 2, in each group 16, the chemical batteries 15 are coupled in parallel; instead, according to a different embodiment (not shown), in each group 16 the chemical batteries are coupled in series.

The storage system 14 for the storage of electric energy includes two rigid busbars 17, which couple the groups 16 of chemical batteries 15 in parallel and have respective connection portions 18, which constitute the connection terminals of the storage system 14 to the outside; in the embodiment shown in the accompanying figures, the connection portion 18 of each rigid busbar 17 coincides with an end of the rigid busbar 17.

The road vehicle 1 is provided with a frame including a flatbed 19 (partially and diagrammatically shown in FIG. 3), which constitutes a bottom wall of the passenger compartment. When the frame is made of metal, the flatbed is either welded or screwed to the frame, while when the frame is made of composite material the flatbed is monolithic (i.e. completely integrated) with the frame. As shown in FIGS. 3-6, a parallelepiped-shaped housing 20, which houses the storage system 14, is obtained in the flatbed 19. The housing 20 is inferiorly delimited by the bottom panel of the flatbed 19, which constitutes a support plane 21 for the storage system 14, is laterally delimited by a rectangular frame 22, and is delimited on top by a lid 23, which is removable and screwed to the frame 22.

Each chemical battery 15 includes a single electrochemical cell 24, which is adapted to convert the stored energy into electric energy, or vice versa, and rests on the support plane 21 constituted by the bottom panel of the flatbed 19. According to a different embodiment (not shown), each chemical battery 15 includes two or more electrochemical cells 24, which are mutually stacked (superimposed). According to a further embodiment (not shown), the housing 20 has a variable height and the various chemical batteries 15 have different heights (i.e. are formed by different numbers of electrochemical cells 24) for following the height variations of the housing 20. Each electrochemical cell 24 has a flat parallelepiped shape (i.e. is shaped like a "tile") having two parallel, opposite larger bases; the size (width and length) of the two larger bases is much greater than the thickness of the electrochemical cell 24, as clearly shown in FIGS. 4 and 5. In each chemical battery 15, the electrochemical cell 24 is arranged parallel to the surface plane 21 (i.e. the two larger bases of the electrochemical cell 24 are parallel to the support plane 21) and rests a larger lower base on the support plane 21.

Furthermore, each chemical battery 15 includes a compression system 25, which maintains the electrochemical cell 24 pressed against the support plane 21 by pressing directly on a larger upper base of the electrochemical cell 24 opposite to the larger lower base. The compression system 25 of each chemical battery 15 is independent from the compression systems 25 of the other batteries 15, i.e. acts autonomously generating a thrust which is completely independent from the thrusts generated by the compression systems 25 of the other chemical batteries 15. By virtue of the pressure exerted on the electrochemical cell 24 by the compression system, a constant, uniform contact between the anode and the cathode and the separator interposed between the anode and the cathode is always guaranteed; in this manner, the electrochemical cell 24 may work in optimal manner, i.e. may have maximum (nominal) performance in terms of delivered electric power, stored electric energy and duration.

The compression system 25 of each chemical battery 15 includes a pair of support elements 26, which are rigidly fixed to the surface plane 21 (typically glued) and are arranged on opposite sides of the electrochemical cell 24. Furthermore, the compression system 25 of each chemical battery 15 includes a series of straps 27, which are arranged next to each other and parallel to each other and are pulled taut between the two support elements 26 (which are in common to all the straps 27 of a same chemical battery 15) to press against a larger upper base of the electrochemical battery 24 and thus keep the electrochemical cell 24 pressed against the support plane 21. According to an embodiment, the straps 27 are made of heat-weldable material (e.g. polyester PET or polypropylene PP). The heat-weldable plastic material straps 27 have high tenacity properties, low elongation percentages, no problem of electric conductivity (because the plastic material is electrically insulating), are inalterable to differences of temperature, are insensitive to humidity, are very light and have a low production and installation cost; in this manner, the straps 27 provide an approximately constant tension over time.

According to an embodiment, each strap 27 is installed by means of a strap pulling tool which heat-welds the ends of the strap 27 to close the strap 27 as a loop to the two support elements 26; the tension of each strap 27 may be indicatively approximately between 400-2300 Newton.

Each support element 26 has for each strap 27 a bar 28 about which the strap 27 is wound. In particular, each support element 26 has a triangular cross section parallelepiped shape and has a series of cavities, each of which defines a corresponding bar 28 about which the end of at least one strap 27 is wound.

According to an embodiment, each compression system 25 includes a lower elastic panel 29, which is arranged between the electrochemical cell 24 and the support plane 21 and has the function of being elastically deformed by effect of the compression exerted by the straps 27 so as to contribute to uniformly distributing pressure.

According to an embodiment, each compression system 25 includes a rigid compression panel 30 (normally made of plastic material or externally electrically insulated composite material), which is arranged between the electrochemical cell 24 and the straps 27 to uniformly distribute the thrust determined by the straps 27 onto the entire upper surface of the electrochemical cell 24. Each compression system 25 may also include an upper elastic panel 31, which is arranged between the electrochemical cell 24 and the rigid compression panel 30, and has the function of being elastically deformed by effect of the compression exerted by the straps 27 so as to contribute to uniformly distributing pressure.

According to an embodiment, each compression panel 30 is shaped so as to display a non-flat shape when it is free from external mechanical stress (i.e. when it is undeformed not being subject to external mechanical stress) and to display a flat shape when it is subjected to the mechanical stress induced by the straps 27. In other words, before applying the straps 27, each compression panel 30 has a flat undeformed shape (i.e. is buckled), while after having applied the straps 27, the deformation induced by the thrust generated by the straps on the compression panel 30 deforms the compression panel 30, making the compression panel 30 assume a flat shape. In this manner, in use, each compression panel 30 has a flat shape which ensures a perfectly uniform, balanced distribution determined by the straps 27 on the entire upper surface of the electrochemical cell 24.

With regards to the shape of the support elements 26, each strap 27 applies onto the corresponding electrolytic cell 24 an oblique thrust, which includes a (prevalent) vertical component directed downwards and perpendicular to the support plane 21 and a (minority) horizontal component directed towards the center of the electrolytic cell 24 and parallel to the support plane 21. The vertical component is used (desired) and performs the function of applying a vertical pressure onto the electrolytic cell 24, while the horizontal component is useless and could even be harmful because it subjects the electrolytic cell 24 to a horizontal compression which only causes a mechanical burden on the electrolytic cell 24. In order to avoid subjecting the electrolytic cell 24 to an unnecessary horizontal compression, one may include a mechanical device which transfers (relieves) the horizontal component of the thrust exerted by each strap 27 onto the corresponding compression panel 30: for example, such a mechanical device could be, for each strap 27, a tooth oriented vertically (i.e. perpendicularly to the support plane 21), which by protruding from the compression panel 30 engages the strap 27.

According to an embodiment, each support element 26 arranged between two chemical batteries 15 arranged side by side is single and in common to both chemical batteries 15; in other words, each side (peripheral) support element 26 supports the straps 27 of only one chemical battery 15, while each central support element 26 supports the straps 27 of two chemical batteries 15 arranged side by side.

According to a possible embodiment, when the frame is made of composite material (i.e. when the flatbed 19 and thus the bottom panel of the flatbed 19 which constitutes the support plane 21 are made of composite material), the support plane 21 could also include a series of metal inserts 32 (typically made of aluminum and glued to the remaining part of the support plane 21), each of which is arranged in contact with the larger lower base of a corresponding electrochemical cell 24 and has a thermal conductivity higher than the remaining part of the support plane 21. The function of the metal inserts 32 is to increase the thermal conductivity at the electrochemical cells 24 so as to allow a better cooling of the electrochemical cells 24 themselves; under the bottom panel of the flatbed 19, which constitutes the support plane 21, there is the external environment, and when the road vehicle 1 is moving the bottom panel of the flatbed is constantly touched by the aerodynamic air allowing to obtain a high cooling power.

An embodiment of the storage system 14 of electric energy described above has many advantages.

Firstly, an embodiment of the storage system 14 of electric energy is simple and cost-effective to make.

Furthermore, an embodiment of the storage system 14 of electric energy described above allows minimizing the overall thickness of the chemical batteries 15; in this manner, the storage system 14 may be arranged also inside a very low height housing 20 (typical of a sporty, high-performance road vehicle 1). By way of example, the housing 20 may have a maximum useful height of approximately 12-15 mm.

Furthermore, an embodiment of the storage system 14 of electric energy described above has a very low overall weight, because all the components of each compression system 25 are made of plastic material or composite material.

Finally, in an embodiment of the storage system 14 of electric energy described above, it is very simple to replace an electrochemical cell 24, because it is sufficient to cut the corresponding straps 27 (because they have a very low unitary cost) and insert new straps 27 (a strap pulling device for inserting the new straps 27 is small and cost-effective and this may also be purchased by a small repair workshop).

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A storage system for the storage of electric energy, the storage system comprising:
   a support plane; and
   a plurality of chemical batteries, each chemical battery including at least one electrochemical cell that rests on the support plane and comprises a flat parallelepiped shape with two mutually parallel, opposite larger bases;
   wherein each electrochemical cell in each chemical battery is arranged parallel to the support plane and rests on a lower larger base on the support plane;
   wherein each chemical battery includes a compression system configured to contact directly on a larger upper base of the electrochemical cell opposite to the lower larger base and configured to keep the electrochemical cell pressed against the support plane, the compression system independent from other compression systems of the other chemical batteries thereby configured to autonomously generate a thrust independent from thrusts generated by the other compression systems of the other chemical batteries;
   wherein the compression system of each chemical battery includes
   a pair of support elements rigidly fixed to the support plane, rising from the support plane, and arranged on opposite sides of the electrochemical cell, and
   at least one strap which is wound around the pair of support elements and is pulled taut between the two support elements;
   wherein each support element includes, for each strap, a bar around which the strap is wound in a loop; and
   wherein each support element comprises a parallelepiped shape with a triangular cross-section having cavities, each cavity defining a corresponding bar.

2. A storage system according to claim 1, wherein the compression system of each chemical battery includes a plurality of straps, each of the plurality of straps arranged next to each other and parallel to each other and are pulled taut between the two support elements common to all the straps.

3. A storage system according to claim 1, wherein each compression system includes a lower elastic panel arranged between the lower larger base of the electrochemical cell and the support plane.

4. A storage system according to claim 1, wherein each compression system includes a rigid compression panel, which is arranged between the larger upper base of the electrochemical cell and the strap, so as to uniformly distribute the thrust determined by the strap on the whole electrochemical cell.

5. A storage system according to claim 1, wherein each compression system includes an upper elastic panel arranged between the larger upper base of the electrochemical cell and the rigid compression panel.

6. A storage system according to claim 1, wherein the rigid compression panel is shaped so as to present a non-flat shape in absence of external mechanical stresses and to present a flat shape when subject to mechanical stresses induced by the strap.

7. A storage system according to claim 1, further comprising a mechanical device configured to transfer a horizontal component of the thrust exerted by the strap on the rigid compression panel.

8. A storage system according to claim 1, wherein a support element arranged between two adjacent chemical batteries is unique and common to both chemical batteries.

9. A storage system according to claim 1, further comprising a housing configured to hold the chemical batteries and is delimited on a lower side by the support plane.

10. A storage system according to claim 9, wherein the housing is laterally delimited by a rectangular frame and is delimited on an upper side by a removable lid attached to the frame.

11. A storage system according to claim 1, wherein the support plane includes a metal insert arranged in contact with each electrochemical cell and having a higher thermal conductivity than a remaining part of the support plane.

12. A vehicle with electric propulsion, the vehicle comprising:
   a hybrid motor propulsion system provided with at least one electric machine;
   a system for storage of electric energy, the storage system including
      a support plane; and
      a plurality of chemical batteries, each chemical battery including at least one electrochemical cell that rests on the support plane and comprises a flat parallelepiped shape with two mutually parallel, opposite larger bases;
      wherein each electrochemical cell in each chemical battery is arranged parallel to the support plane and rests on a lower larger base on the support plane;
      wherein each chemical battery includes a compression system configured to contact directly on a larger upper base of the electrochemical cell opposite to the lower larger base and configured to keep the electrochemical cell pressed against the support plane, the compression system independent from other compression systems of the other chemical batteries thereby configured to autonomously generate a thrust independent from thrusts generated by the other compression systems of the other chemical batteries;
      wherein the compression system of each chemical battery includes
         a pair of support elements rigidly fixed to the support plane, rising from the support plane, and arranged on opposite sides of the electrochemical cell, and
         at least one strap which is wound around the pair of support elements and is pulled taut between the two support elements;
      wherein each support element includes, for each strap, a bar around which the strap is wound in a loop; and
      wherein each support element comprises a parallelepiped shape with a triangular cross-section having cavities, each cavity defining a corresponding bar; and
   a flatbed, which constitutes a bottom wall of a passenger compartment and presents a bottom support panel for each electrochemical cell.

13. A storage system according to claim 1, wherein:
the straps comprise heat-weldable flexible plastic material; and
the ends of each strap are heat-welded to close the strap as a loop to the two support elements.

\* \* \* \* \*

UNITED STATES PATENT AND TRADEMARK OFFICE
CERTIFICATE OF CORRECTION

PATENT NO. : 9,023,502 B2  
APPLICATION NO. : 13/404406  
DATED : May 5, 2015  
INVENTOR(S) : Fabrizio Favaretto Page 1 of 1

It is certified that error appears in the above-identified patent and that said Letters Patent is hereby corrected as shown below:

In the claims

In Claim 5, Column 7, line 14, "claim 1", should read -- claim 4 --.

In Claim 6, Column 7, line 18, "claim 1", should read -- claim 4 --.

In Claim 7, Column 7, line 23, "claim 1", should read -- claim 4 --.

Signed and Sealed this  
First Day of March, 2016

Michelle K. Lee  
*Director of the United States Patent and Trademark Office*